W. RAABE.
AUTOMATIC LIQUID TESTING APPARATUS.
APPLICATION FILED MAR. 15, 1910.

978,644.

Patented Dec. 13, 1910.

3 SHEETS—SHEET 1.

Witnesses

Inventor
Walter Raabe
By
Atty

W. RAABE.
AUTOMATIC LIQUID TESTING APPARATUS.
APPLICATION FILED MAR. 15, 1910.
978,644.
Patented Dec. 13, 1910.
3 SHEETS—SHEET 2.
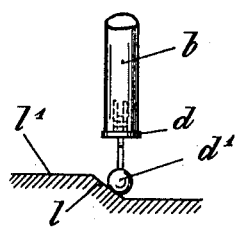
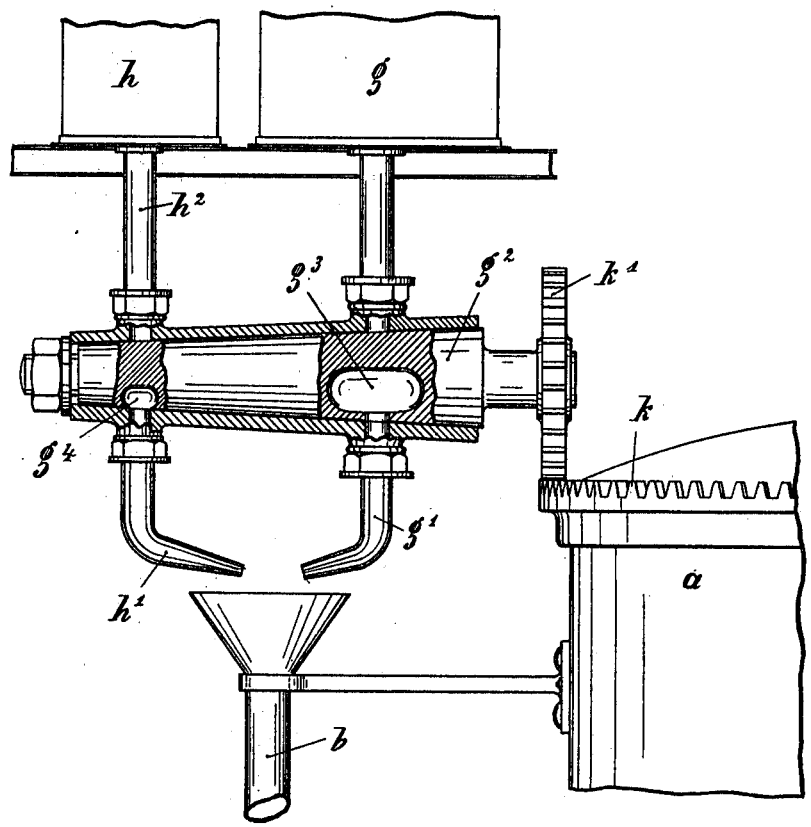

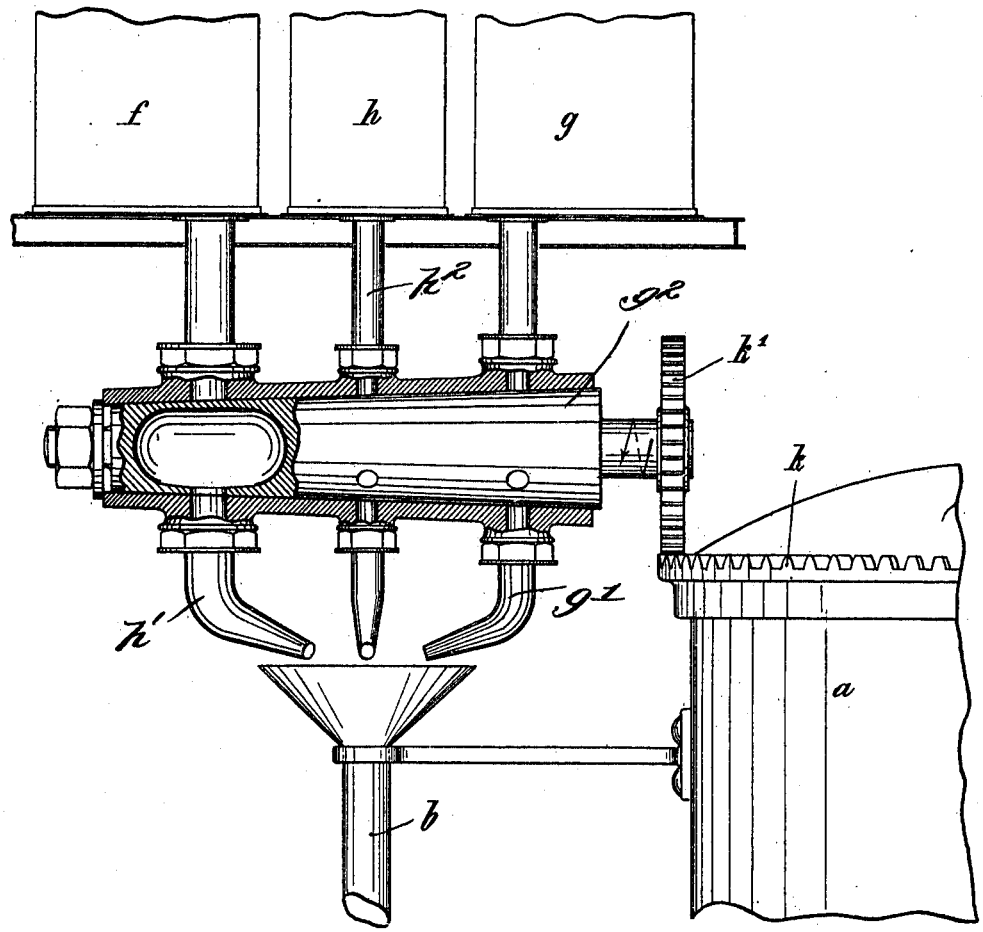

UNITED STATES PATENT OFFICE.

WALTER RAABE, OF BRUNSWICK, GERMANY, ASSIGNOR TO GUSTAV DIETZ, OF BRUNSWICK, GERMANY.

AUTOMATIC LIQUID-TESTING APPARATUS.

978,644.  Specification of Letters Patent.  Patented Dec. 13, 1910.

Application filed March 15, 1910.  Serial No. 549,429.

*To all whom it may concern:*

Be it known that I, WALTER RAABE, a subject of the Emperor of Germany, residing at Brunswick, Duchy of Brunswick, Empire of Germany, have invented certain new and useful Improvements in Automatic Liquid-Testing Apparatus, of which the following is a specification.

My invention relates to improvements in apparatus for automatically testing condensing water and other liquids as to the contents of their admixtures. In sugar and other factories the condensing water is tested as to its contents in sugar before being used again, for which purpose a certain amount of the water (1 cubic centimeter) is filled into a test tube whereupon the same amount of sulfuric acid and a few drops of a-naphthol-, thymol- or camphor solution are added. As is known in the art if there is any sugar in the water, the water is colored by the reagent where it comes in contact with the sulfuric acid.

The object of the improvements is to provide a testing apparatus whereby this test is automatically performed, so that the water can easily and continually be controlled. While in the following for the purpose of explaining the invention reference will be made to the method of testing water as to its contents in sugar, I wish it to be understood, that my invention is not limited to such use of the apparatus, and that the same may be used for testing water or liquids which contain other admixtures, in which case the reagents referred to hereinafter are substituted by other reagents, such for example as silver nitrate, barium chlorid, sulfuric acid, etc.

For the purpose of explaining the invention an example embodying the same has been shown in the accompanying drawings in which the same letters of reference have been used in all the views to indicate corresponding parts.

Figure 1:
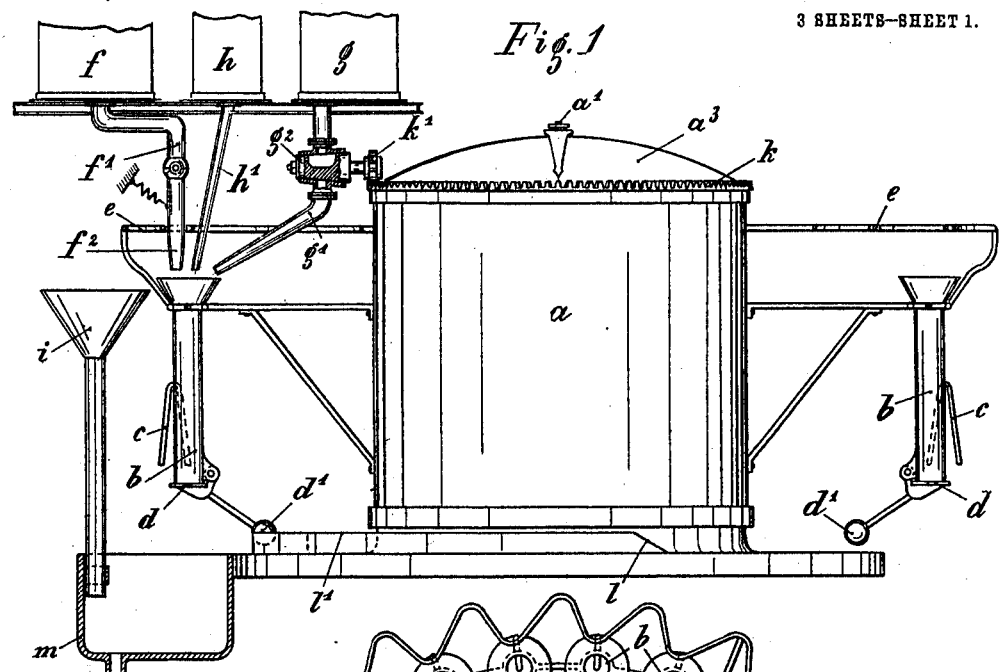
Figure 2:
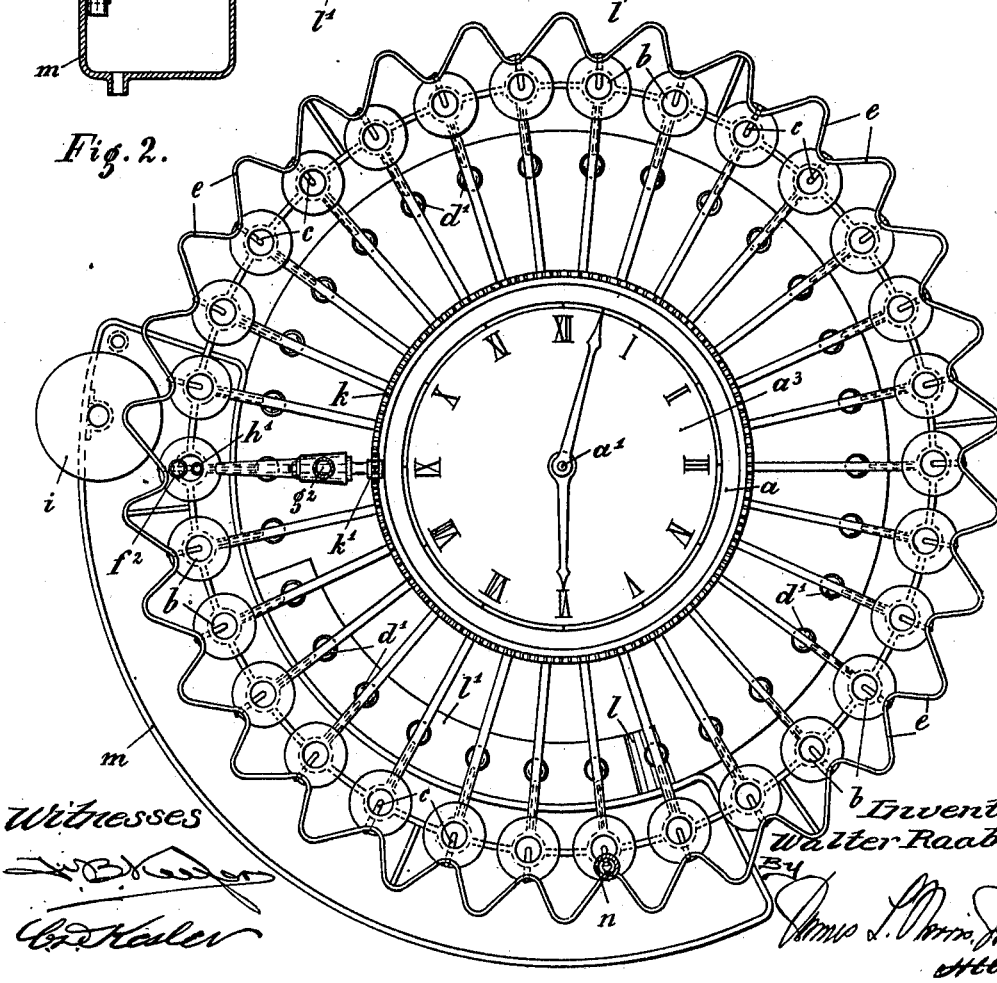

In said drawings—Figure 1, is a front view of the apparatus partly in section, Fig. 2, is a plan of Fig. 1, Fig. 3, is a detail view, Fig. 4, is an enlarged side view, partly in section, of a modification of the controlling device for the liquid supply. Fig. 5 is a view similar to Fig. 4 of a further modification.

Referring to the example illustrated in Figs. 1 to 3 of the drawings, a frame $a$ adapted to be rotated about its perpendicular axis by means of a suitable clock mechanism carries a plurality of test tubes or glasses $b$ about its circumference. The number of the test tubes mounted on the frame is different according to various conditions and I have found that 30 tubes give satisfactory results. Each of the said test tubes is provided with a siphon $c$ whereby after having received its water supply it is automatically emptied to a certain level, a lower valve $d$ constructed in the form of a cock or a hinged disk, and a controlling member $e$ which in the example shown consists of an abutment preferably formed with a cam surface. The tubes coöperate with three receptacles $f$, $g$, $h$, through which the liquid to be tested, and testing liquids, in the example referred to a few drops of a-naphthol-, thymol-, or camphor solution acting as a reagent, and sulfuric acid are admitted, and when the frame $a$ is rotated by means of its clock mechanism each of the test tubes are successively moved below the discharge ends of the said receptacles. When a test tube is thus being advanced below the discharge ends of the said receptacles, its controlling abutment $e$ moves a rockable part $f^2$ of the discharge tube $f^1$ over the test tube. In the normal position of the discharge tube $f^1$ the liquid flows into a pipe $i$. By means of a measuring cock $g^2$ controlled from the clock mechanism by means of a toothed gearing $k$, $k^1$ a certain amount of sulfuric acid is supplied to the test tube through a tube $g^1$, and finally the receptacle $h$ admits a few drops of the reagent into the test tube through its drop tube $h^1$. By properly dimensioning the discharge openings of the receptacles $g$ and $h$ the amount of the reagent and the sulfuric acid can be determined so as to remain the same when being open a certain time. The amount of the water subjected to the test is controlled by the siphon $c$ which removes any water which is in excess of the desired amount. The abutments $e$ one of which is provided for each of the test tubes $b$ may have any desired form.

Preferably the test tubes are emptied at a point which is located a short distance before the filling point, so that the said tubes are emptied after having passed substantially over nearly the whole circumference of the frame $a$. Thereby a large number of the test tubes is always available to determine the result of the test made during a certain period of time. The clock mechanism is equipped with a dial $a^3$ by means of which the attendant can easily ascertain at what times the water (in the example referred to) contained sugar. The test tubes are automatically emptied. For this purpose the valve $d$ provided at the bottom of the test tube is automatically opened by striking against an abutment or cam face $l$. Thereby the contents of the test tube are discharged into a receptacle $m$ which in the example shown in Fig. 2 is constructed in the form of a segmental trough corresponding to the circular form of the frame $a$, so that also the residue of the water may drop into the said trough. Also the tube $i$ and the siphon $c$ may be so directed as to discharge into the said trough. Upon further revolution of the frame $a$ the valve $d$ slides off the cam face so that it is moved in its closing position by means of a weight $d^1$. At the point where the test tubes are emptied a flushing pipe $n$ may be provided which supplies a flushing liquid either continually, or at the proper moment. By providing a long plane surface $l^1$ on the cam face $l$ over which the weight $d^1$ slides after the tube $b$ has been opened, the said tube is held open long enough to permit the flushing liquid to flow out of the same.

In the example shown the test tubes $b$ are mounted on a frame $a$ which is directly mounted on the clock mechanism. But I wish it to be understood, that my invention is not limited to such construction. In the example shown in Fig. 4, also the discharge tube $h^2$ of the receptacle $h$ supplying the reagent is connected to the measuring cock $g^2$, and the latter is formed with two grooves $g^3$ and $g^4$, the sizes of which are such as to supply the proper amounts of the liquids to the test tube $b$. Upon each complete or partial rotation the cock $g^2$ takes a definite amount of liquid from the receptacles $g$ or $h$ and discharges the same into the discharge pipes $g^1$ and $h^1$. To prevent the liquids from being vehemently thrown into the test tube $b$ the lower ends of the tubes $g^1$ and $h^1$ are horizontally bent, so that the liquids flowing from the measuring cock $g^2$ are thrown against the bottom parts of the said tubes from whence they flow gradually to the discharge ends of the tubes. If desired, the measuring cock may be provided with a third cavity as shown by Fig. 5 for controlling the flow of the water to the discharge tube $f^1$.

I claim herein as my invention:

1. In an apparatus for automatically testing liquids, the combination with a plurality of test tubes, of automatic means to successively supply the liquid to be tested and a reagent to said test tubes, automatic means to successively remove said liquid and reagent from the test tubes, and automatic flushing means for said test tubes.

2. In an apparatus for automatically testing liquids, the combination, with a frame adapted to be rotated about its perpendicular axis, and a plurality of test tubes mounted circumferentially on said frame, of automatic means to successively supply the liquid to be tested and a reagent to said test tubes, and automatic means to successively remove said liquid and reagent from the test tubes.

3. In an apparatus for automatically testing liquids, the combination with a frame adapted to be rotated about its perpendicular axis, a plurality of test tubes mounted circumferentially on said frame, each of said test tubes being provided with a siphon adapted to withdraw the liquid to a certain level and a valve at its bottom, receptacles disposed above said test tubes and extending with their discharge ends above the path of the same, automatic means to supply a liquid from each of said receptacles to said test tubes, and automatic means to open the valve provided at the bottom of each of said test tubes, said opening means being disposed at a point away from the discharge ends of said receptacles.

4. In an apparatus for automatically testing liquids, the combination with a frame adapted to be rotated about its perpendicular axis, and a plurality of test tubes disposed circumferentially on said frame, of automatic means to successively supply the liquid to be tested to said tubes, an automatically actuated measuring cock discharging into said test tubes, means to supply a testing liquid to said measuring cock, and automatic means to empty said test tubes.

5. In an apparatus for automatically testing liquids, the combination with a frame adapted to be rotated about its perpendicular axis, and a plurality of test tubes disposed circumferentially on said frame, of automatic means to successively supply the liquid to be tested to said tubes, an automatically actuated measuring cock discharging into said test tubes, said measuring cock being provided with a plurality of measuring chambers, means to supply a testing liquid to each measuring chamber of said measuring cock, and automatic means to empty said test tubes.

In testimony whereof I have hereunto set my hand in presence of two subscribing witnesses.

WALTER RAABE.

Witnesses:
WILHELM LEHRKE,
JULIUS SECKEL.